A. S. BALDWIN.
EXPANSION JOINT.
APPLICATION FILED DEC. 19, 1917.
1,318,525.
Patented Oct. 14, 1919.
2 SHEETS—SHEET 1.
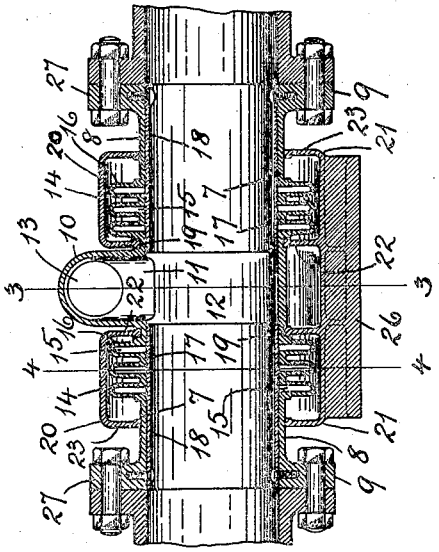
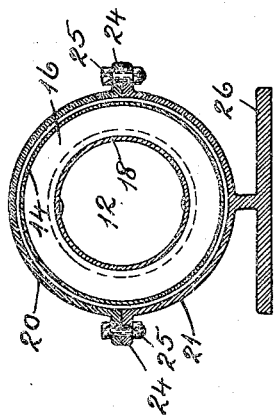
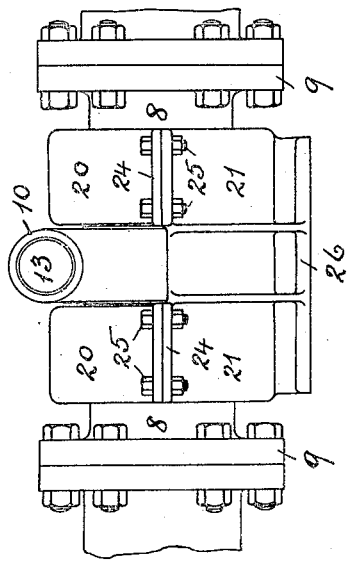
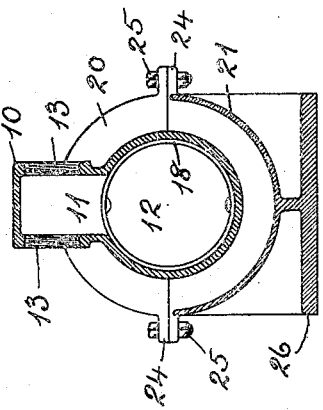
INVENTOR.
Arthur S. Baldwin
BY
ATTORNEYS.

A. S. BALDWIN.
EXPANSION JOINT.
APPLICATION FILED DEC. 19, 1917.

1,318,525.

Patented Oct. 14, 1919.
2 SHEETS—SHEET 2.

INVENTOR.
Arthur S. Baldwin
BY
Mann & Co.
ATTORNEYS.

UNITED STATES PATENT OFFICE.

ARTHUR S. BALDWIN, OF BALTIMORE, MARYLAND.

EXPANSION-JOINT.

1,318,525.      Specification of Letters Patent.     Patented Oct. 14, 1919.

Application filed December 19, 1917. Serial No. 207,892.

*To all whom it may concern:*

Be it known that I, ARTHUR S. BALDWIN, a citizen of the United States, residing at Baltimore, in the State of Maryland, have invented certain new and useful Improvements in Expansion-Joints, of which the following is a specification.

This invention relates to an improved construction of expansion joint for pipe lines whereby to permit expansion and contraction of the pipe line, due to changes in temperature.

Some of the objects of the invention are to provide an improved construction of corrugations around the expansion and contracting member of the joint whereby to materially facilitate the expansion and contraction; to provide an improved bearing or guide surface at the inner circumference or base of the corrugations; to provide improved means for limiting the expansion at a joint; to provide an improved construction and arrangement of anchor and centering means at lateral leads or branches from the main line, whereby to form a bearing and guide-anchor that will permit both the main and branch pipe-line ends to move longitudinally during expansion and contraction, but prevent their lateral displacement.

With these and other objects in view, the invention is illustrated in the accompanying drawings, in which,—

Figure 1, shows, in side elevation, the improved anchor joint providing main line and lateral lead or branch line connections.

Fig. 2, illustrates the same in vertical longitudinal section.

Fig. 3, shows a cross-section through the same on the line 3—3 of Fig. 2.

Fig. 4, illustrates another cross-section taken on the line 4—4 of Fig. 2.

Figure 5:
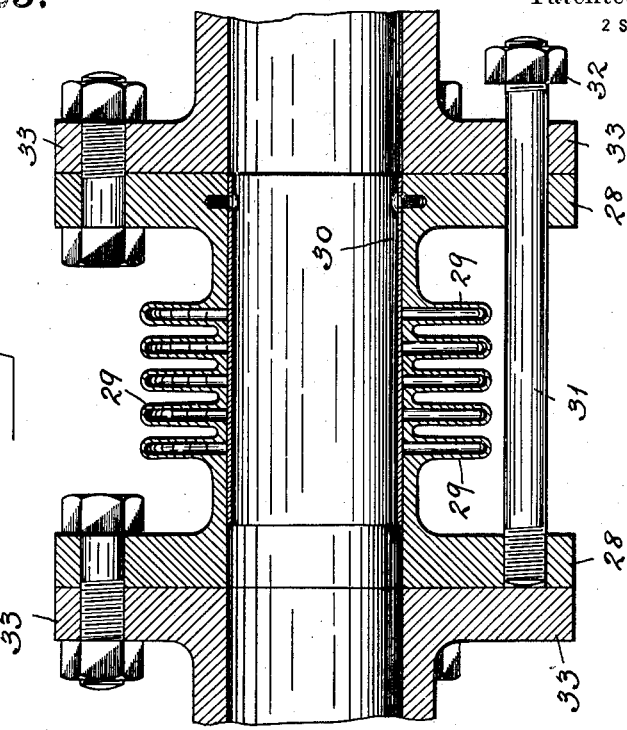
Fig. 5, shows a joint embodying the invention for use in the pipe line but omitting the anchor and branch line features.

Referring to the drawings, and particularly Figs. 1 to 4 thereof the numeral 7, designates the expansible member having tubular end portions 8, and enlarged circular flanges 9, at the outer end of each tubular portion. The intermediate portion of the expansible member, that is, between the tubular end portions 8, may vary somewhat in construction, as will presently be pointed out, but in the structure disclosed in Figs. 1 to 4 inclusive said member is provided at one side, preferably the upper side, with an extension 10, producing a lateral chamber 11, which is always in communication with the central longitudinal passage 12, that extends through the expansible member from one flange to the other. The extension 10, of the expansible member is provided with one or more threaded openings 13, for connection with a branch pipe or pipes so that lateral leads may be directly connected to the expansible member.

Between the lateral extension and each end flange 9, the expansible member is provided with a series of annular flanges 14, of peculiar formation. These flanges differ from the ordinary corrugations, usually employed in expansion joints, in that the annular spaces 15, produced between them are of substantially uniform width from the inner to the outer circumference which is due to the fact that the spaced-apart walls 16, are substantially parallel. It will also be noted that at the inner circumference a wall of one flange and a wall of the next adjacent flange are connected by an annular lateral portion 17, that is of a greater thickness than the thickness of the flange-walls so that the lateral annular connections 17, between the inner ends or bases of the several hollow flanges are less flexible than the parallel walls that form the flanges. It will also be noted that the annular connections 17, between the adjacent flange-walls are angular in cross-section which reinforces them and prevents compression in a cross-wise direction so that whatever compression or expansion that actually occurs will take place in the flange-walls at the outer side of the annular connections.

By referring to Fig. 2, of the drawing it will further be seen that in my structure the depth of the annular flanges 14, is decidedly greater than the width of the spaces 15, formed by the two walls of each flange, consequently a greater degree of expansion or contraction, is attained without liability of setting the metal at and around the inner circumference of the flanges.

In the structure disclosed in Figs. 1 to 4, I provide tube sections 18, which extend from each circular flange 9, inwardly in the longitudinal passage 12. Each of these tube sections extends crosswise of the annular spaces 15, and has a sliding fit against the circular walls of the lateral flange connections 17, and thereby internally braces the lateral flanges during expansion or contraction of the corrugations between those flanges.

By reference to Fig. 2, of the drawing it will be noted that an annular groove 19, is provided around the outer side of the expansible member between the lateral extension 10, and the innermost annular flange, and that a casing with upper and lower parts 20 and 21 encircles the expansion member and bridges over or forms an annular chamber to receive the series of annular flanges or corrugations. This casing has an annular inturned flange 22, at one side which extends around and fits or enters the groove 19, of the expansible member and at the opposite side is provided with another inturned stop flange 23, which snugly embraces the circular wall of the end portion 8, of the expansible member. This stop flange 23, normally has position separated or spaced from the outermost annular flange of the expansible member and serves as a stop against which the said outermost flange may contact during the expansion of said member. It will thus be understood that the annular flanges or corrugations of the expansible member may expand in the chamber of the casing and between the two flanges 22 and 23, but that flange 23, forms a stop to limit the expansion movement.

For convenience in construction and assembly each casing is formed in two semi-circular parts 20 and 21 which are provided with flanges 24, at their meeting edges so that bolts 25, may secure them together.

The lower semi-circular part 21, of the casing is cast integrally with or sustained on a foundation plate 26, which extends horizontally beneath and sustains the entire joint, and this plate 26, may be securely anchored and rigidly held in place so that the two casing parts may serve as a rigid bearing and guide for the expansible members of the joint to which the pipe-line connections are made.

Bolt holes 27, are provided in the circular flanges 9, by means of which they may be rigidly connected to the pipes 30, of the pipe line.

Figure 6:
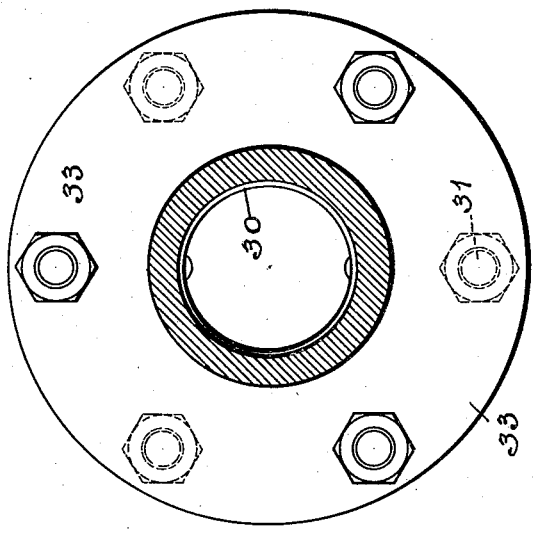
Fig. 6, illustrates an end view of the same.

In Figs. 5 and 6, invention is embodied in the form of a mere expansion joint, and the branch or lateral lead is omitted. In this form however the expansible member has the two circular flanges 28, between which are located the series of annular flanges 29, which have precisely the same formation as the annular flanges 14, in the structure shown in Figs. 1 to 4 inclusive, and a repetition in the description of this structure is deemed unnecessary.

In this form the internal tubular brace 30, has the same construction and operation as the tube sections 18, in the form in Figs. 1 to 4.

The main difference between the form of Figs. 5 and 6, and that of Figs. 1 to 4, lies in the form of stop device to limit the expansion. In this form, the flanges 28, sustain bolts 31, which have one end screwed into one flange and their other ends extending loosely through the other flange,—a head 32, being provided on the latter end to form a stop and limit the expansion.

In Fig. 5, the flanged ends 33, of the pipe line are shown bolted to the flanges 28, of the expansion member.

Having described my invention what I claim is:—

1. In an expansion joint, an expansion member having a flange at each end for connection with a pipe line and between said end-flanges said member being provided with a series of spaced annular expansion flanges formed integrally with said member and the metal of said member that connects one expansion flange with another being also integral with said member and said flanges and also being of a greater thickness than the metal forming the wall of said expansion flange whereby to render the integral connection between the flanges less flexible than the flanges themselves.

2. In an expansion joint, an expansion member having an integrally-formed flange at each end and between said integrally-formed end-flanges said member being provided with a series of spaced annular expansion flanges which latter are also integral with said member and the integral end flanges, said integral expansion flanges being connected by metal that is also integral with said flanges but of greater thickness than the walls of said expansion flanges, and means bridging the exterior of said expansion flanges for limiting the expansion movement of said member.

3. In an expansion joint, an expansion member having an integral flange at each end with a series of spaced-apart annular expansion flanges which latter flanges are also integral with said member and its end flanges, a tubular brace on the interior of said integral expansion member at the inner side of the expansion flanges and means bridging the exterior of all of said expansion flanges for limiting the expansion movement of the member.

4. In an expansion joint, an expansion member having a flange at each end and a series of integral expansion flanges on the member between the end flanges, and rigid encircling means inclosing the integral flanges and forming a stop that is independent of the end flanges and which limits the expansive movement of the said member.

5. In an expansion joint for pipe lines, an expansion section having two separated series of integrally-formed expansion flanges and between said two series of flanges said section being provided with a member which projects laterally beyond the said flanges and is formed integrally with said flanges and said laterally-projecting member being provided with a lateral outlet for connection with a branch or lateral lead.

6. In an expansion joint for pipe lines, an expansion member having tubular end portions and an intermediate laterally-extending portion which is formed integrally with the tubular end portions and which latter is provided with a chamber and an opening for connection with a branch or lateral lead,—the tubular end portions at each side of the laterally-extending intermediate portion having integrally formed expansion flanges, and means between the ends of the tubular end portions for supporting the expansion member.

7. In an expansion joint, an expansion member having a longitudinal passage therethrough and provided with an integrally-formed member with a lateral opening therefrom and at opposite sides of the said integrally formed expansion member being provided with a series of integral expansion flanges and means at each side of the said opening and encircling the integral expansion flanges for limiting the expansion movement.

8. In an expansion joint, an expansion member having means at opposite ends to secure it to a pipe line and provided with a series of expansion flanges between said opposite ends, and a casing having an inturned flange at each end said casing embracing the outer side of all the expansion flanges and one inturned flange of said casing lapping one end-expansion flange and the other inturned flange of the casing having a lapped relation with respect to the other end-expansion flange the intermediate expansion flanges being free of said casing.

9. In an expansion joint, an expansion member having means at opposite ends to secure it to a pipe line and provided with a series of integral expansion flanges between said opposite ends; two semi-cylindric casings bridging respectively the under and upper sides of all the integral expansion flanges and all of said integral expansion flanges being free in the casings.

10. In an expansion joint, an expansion member having means at opposite ends to secure it to a pipe line and provided with an outlet for connection with a branch line said expansion member at opposite sides of said outlet having a series of expansion flanges and a casing at each side of the said outlet and inclosing the expansion flanges,—said casings embracing the expansion member and forming guides for the latter.

In testimony whereof I affix my signature in the presence of two witnesses.

ARTHUR S. BALDWIN.

Witnesses:
FRANCIS S. STIERTZ,
WM. M. TUCKER.